June 29, 1954 H. WEISSMAN 2,682,199
SPECTACLE FRONT
Filed July 29, 1952
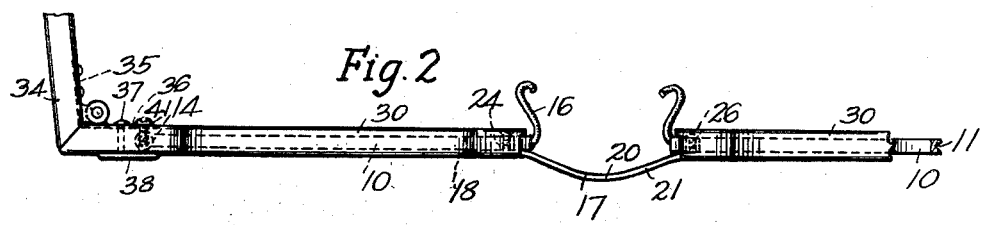
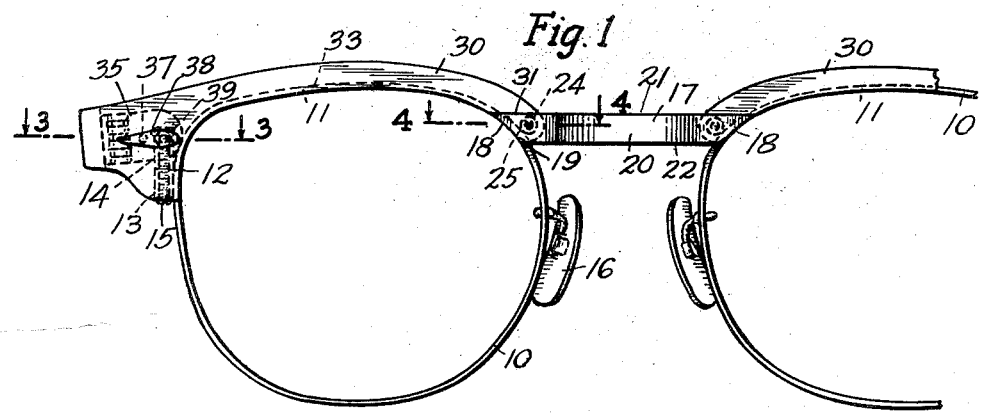
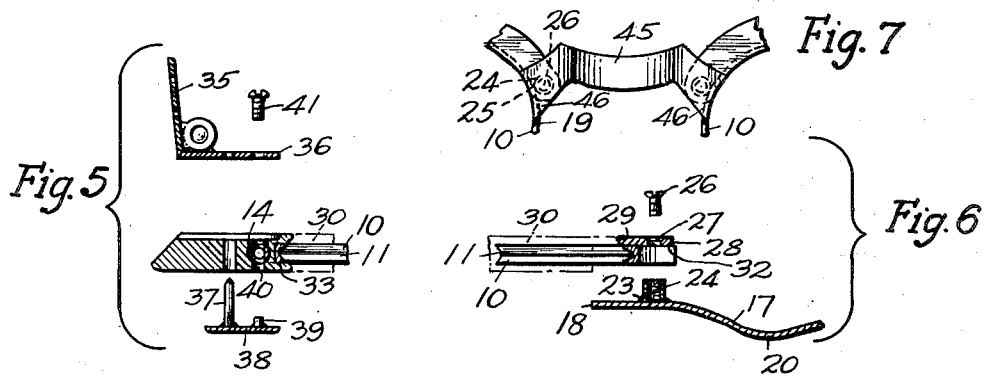
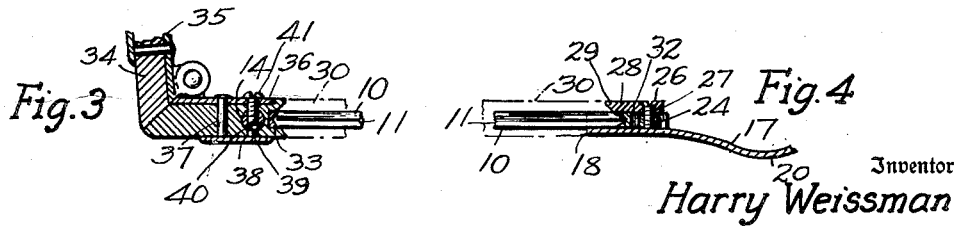
Inventor
Harry Weissman
By
Harry Jacobson
Attorney

Patented June 29, 1954

2,682,199

UNITED STATES PATENT OFFICE 2,682,199

SPECTACLE FRONT

Harry Weissman, New Hyde Park, N. Y.

Application July 29, 1952, Serial No. 301,565

11 Claims. (Cl. 88—41)

1

This invention relates to spectacle fronts and particularly to that type having a removable zyl top or eyebrow piece receiving and covering the upper part of a metallic eyewire constituting a lens frame.

The eyebrow pieces of such spectacle fronts are designed for connection to relatively thick zyl temples whereby each eyebrow piece may be disassembled from its eyewire with its temple as a unit. Various types of connections have heretofore been employed to secure the plastic eyebrow piece to the split eyewire at the nasal and temporal ends of the spectacle front. However, many of such connections have not been entirely satisfactory, being insecure or lacking the strength to withstand repeated removal or long wear, or have detracted from the good appearance of the spectacles, or having been unsatisfactory for other reasons.

The present invention therefore contemplates the provision of a simple, easily and rapidly manipulatable strong and durable connection between the plastic eyebrow piece and the metallic eyewire and bridge, whereby the eyebrow piece may be relatively rapidly and repeatedly removed and replaced with ease and efficiency.

The invention further contemplates the provision of an inexpensive and effective connection between one end of the eyebrow piece and the bridge, which connection is not only detachable, but which is invisible from the front of the spectacles and is adapted to assume various ornamental shapes, and the arrangement of the bridge on the front faces of and overhanging the eyewires to attain a maximum offset away from the nose with a minimum bend in the bridge.

The invention further contemplates the provision of a detachable connection between the plastic eyebrow piece and the adjacent metallic parts, and a permanent connection between the bridge and the eyewire comprising an internally threaded projection from the bridge secured to the eyewire and adapted to receive a screw passed forwardly through the end of the eyebrow piece, while allowing a maximum area of the bridge to come into contact with the eyewire for soldering purposes, the projection imparting additional strength to the connection while being concealed from view normally behind the bridge.

The various objects of the invention will be clear from the description which follows and from the drawings, in which Fig. 1 is a fragmentary front elevational view of the spectacle front, certain parts being broken away.

2

Fig. 2 is a top plan view thereof.

Fig. 3 is a horizontal sectional view of the detachable temporal end connection between the eyebrow piece and the eyewire, taken on the line 3—3 of Fig. 1.

Fig. 4 is a horizontal sectional view of the detachable nasal end connection between the eyebrow piece, the bridge and the eyewire, taken on the line 4—4 of Fig. 1.

Fig. 5 is a view similar to Fig. 3, of the parts shown in Fig. 3 partly disassembled and separated.

Fig. 6 is a view similar to Fig. 4, of the parts shown in Fig. 4, partly disassembled and separated.

Fig. 7 is a view similar to Fig. 1, of a modified form of the bridge and of the parts adjacent thereto.

In the practical embodiment of the invention shown by way of example, each of the metallic eyewires 10 has an inner lens-receiving groove 11 therein and is split at the temporal end thereof as at 12 in the usual manner to permit most lens replacements when necessary. The usual clamping tubes 13 and 14 are secured to the respective split ends of the eyewires and the usual screw 15 adapted to be screwed into the tube 14 holds the split ends separably together. At the nasal ends of the eyewires, the nose pads 16 of any of the usual types are soldered in place.

The bridge 17 is arranged in upward spaced relation to the nose pads and is secured at its rear face to the front surface of the adjacent eyewire, as by soldering or the like (Fig. 4) and so as to project in front of or to overhang the eyewires. The end edge 18 of the bridge is preferably of the same curved contour as, and terminates at, the adjacent inner edge part of the eyewire to which it is secured. Preferably, the bridge is permanently assembled with the eyewire as by means of solder or the like indicated at 19, Fig. 1. At its middle part 20, the bridge is offset forwardly to clear the nose of the wearer, but by reason of the arrangement of the bridge in front of the eyewires, the amount of the offset may be substantially reduced over that heretofore needed. The bridge illustrated in Fig. 1 is made of a metallic strip of uniform height, having a straight top edge 21 and a parallel straight bottom edge 22 between the concave edges 18.

Projecting rearwardly from the rear face of the bridge and suitably secured thereto as by the solder 23 is the internally threaded projection in the form of a tube 24 (Figs. 4 and 6), which is also preferably soldered to the adjacent part of the eyewire with which it is in contact at at 25, Fig. 1. The tube 24 is adapted to receive the screw 26 passing forwardly from the rear of the eyebrow piece 30 through the hole 27 in the projecting ear 28 at the temporal end 29 of the eyebrow piece, thereby to removably hold said ear to the bridge and eyewire. The usual plastic, such as zylonite, commonly termed "zyl" is employed for the piece 30.

To permit the assembly and disassembly of the eyebrow piece relatively to the bridge and eyewire, an ear as 28 is formed by recessing the end 29 of said piece to receive the preferably flat end part of the bridge, as well as the attached tube 24 and the adjacent part of the eyewire. The top wall 31 of the recess in front of the ear 28 fits and contacts with the top edge 21 of the bridge. In the case illustrated in Fig. 1, said top edge is straight and horizontal, and the upright front wall 32 of the ear 28 forms the rear wall of the recess. It will be understood, however, that the bridge and the corresponding wall 31 which is fitted to the edge of the bridge, may assume shapes and positions other than straight or horizontal as shown in Fig. 7, whereby the connection and bridge lend themselves to ornamental shaping in a wide variety of forms. It will also be understood that the eyewire 10 is received frictionally only within a suitable groove 33 in the inner edge of the eyebrow piece 30 in the usual manner and may readily be separated therefrom when the parts holding the ends of said piece in place, are disconnected.

At its temporal end, the temple 34 is pivotally secured to the piece 30 as by means of the hinge 35. The leaf 36 of said hinge is permanently secured to the piece 30 as by means of the rivet 37 projecting rearwardly from the rivet shield 38 through the piece 30 and through the leaf 36, and headed on the inner or rear face of said leaf. To prevent relative rotation of said leaf and shield about the rivet 37, a relatively short pin 39 projects from the shield into the eyebrow piece. A hole 40 made through the eyebrow piece 30 and through the clamping tube 14 may be utilized to receive the pin 39 as shown. The screw 41 screwed forwardly into the piece 30 and into said tube 14 at the hole 40 serves detachably to connect the temporal end of the eyebrow piece, together with the temple and hinge secured thereto, to the tube 14 and therethrough to the eyewire 10.

In the form of the bridge and connection shown in Fig. 7, the bridge 45 has downwardly and outwardly extending flat end parts 46 soldered to the eyewire 10 over a relatively large area for strength. The tube 24 is soldered to the rear face of the bridge and to the eyewire as hereinbefore described in connection with Figs. 1–6, and similarly receives the screw 26. The upper and lower edges of the bridge are, in this case, neither horizontal nor straight, as are the edges 21 and 22 of the bridge 17, to illustrate one of the numerous other shapes which the bridge and connection may assume.

It will now be seen that the zyl eyebrow piece may be removed merely by removing the screws 26 and 41 at the respective ends of said piece and then lifting the piece together with the hinge and temple carried thereby off the eyewire. The removed piece 30 or a different eyebrow piece having the proper recesses, grooves and holes for the reception of the clamping tubes, eyewire, bridge end, pin 39 and screws 26 and 41, may be secured in place by setting said piece in its proper position around the eyewire and fastening the respective ends in place by the screws 26 and 41. It will also be seen that each of the end edges of the bridge conforms to the shape of and terminates at the inner peripheral edge of the adjacent eyewire to make a wide area contact therewith and to avoid interference with the lens inserted in the customary way into the eyewire, while presenting a good appearance.

While certain specific forms of the invention have herein been shown and described, various obvious changes may be made therein without departing from the spirit of the invention defined by the appended claims.

I claim:

1. In spectacles provided with metallic eyewires, an imperforate metallic bridge joining the eyewires and having a flat end part at each end thereof, a pair of plastic eyebrow pieces each receiving the top part of one of the eyewires, a perforated ear projecting inwardly from the rear part of the nasal end of each eyebrow piece and in rearward spaced relation to the corresponding flat end part of the bridge, means detachably connecting the ear to the bridge comprising an internally threaded combined spacer and tube having a flat end surface secured to the rear surface of the flat end part of the bridge and to the outer surface of the eyewire and arranged in front of the ear, and a screw passing forwardly through the ear and into the tube, a hinge at the temporal end of the eyebrow piece and spaced from the eyewire, a second screw passing through the hinge and into the eyebrow piece and having an operative connection to the eyewire and a temple carried by the hinge and removable from the eyewire with the eyebrow piece and the hinge as a unit on the removal of said screws.

2. The spectacles of claim 1, there being a recess in the eyebrow piece in front of the ear and extending to the front face of the eyebrow piece, said recess being sufficiently deep to receive an adjacent flat end part of the bridge and the tube and to arrange the front face of the bridge in a position substantially coplanar with that part of the front surface of the eyebrow piece beyond the ear and thereby to expose the entire area of the front face of the bridge.

3. The spectacles of claim 2, the rear face of the end portion of the bridge being soldered to the front surface of the eyewire, the end edge of the bridge registering with and being of the same curved shape as the adjacent part of the eyewire, and the tube being soldered to the bridge and to the eyewire.

4. In a spectacle front, a pair of metallic eyewires, a metallic bridge having the respective end parts thereof substantially flat and secured to the eyewires with the rear face of the bridge at the front surfaces of the eyewires, a plastic eyebrow piece receiving the upper part of and arranged at and forwardly overhanging each of the eyewires with the front surfaces of said piece substantially flush with the front face of the adjacent one of said end parts of the bridge, the bridge terminating at the inner edges of the eyewires and the respective end edges of the bridge being contoured to correspond to said inner edges, means including a projecting perforated ear on the eyebrow piece and a fastening element passing through the ear and connected to the bridge for connecting the nasal end of the eyebrow piece to the bridge and to the adjacent eyewire, and means detachably connecting the temporal end of the eyebrow piece to the temporal end of the adjacent eyewire, the eyewire being split at the temporal end thereof and provided with threaded clamping members including a pair of tubes, at said temporal end, the second mentioned means comprising a screw passing forwardly from the rear of the eyebrow piece into one of said pair of tubes, the axis of the screw being substantially perpendicular to the axis of said one of the tubes.

5. The spectacle front of claim 4, the first mentioned means comprising an internally threaded tube secured to the rear face of one of the end parts of the bridge, and the fastening element comprising a screw.

6. In a spectacle front, an eyewire, a bridge having the rear face of the end part thereof secured to the front surface of the eyewire and thereby forwardly overhanging the eyewire, an internally threaded combined spacer and tube projecting rearwardly from the rear face of the bridge and secured to an adjacent nasal portion of the eyewire, an eyebrow piece covering the upper portion of the eyewire, said piece having a recess at one end thereof completely open at the front thereof and receiving said end part of the bridge and the tube, a perforated ear at said one end of said piece forming the rear of the recess, a screw passing through the perforation of the ear and into the tube, a hinge secured only to the temporal end of the eyebrow piece, a temple carried by the hinge and a second screw detachably attaching the hinge to the eyewire whereby the eyebrow piece, temple and hinge are removable as a unit from the bridge and from the eyewire on the detachment of the screws.

7. In a spectacle front, an eyewire, a bridge having the rear surface of the end part thereof secured to the front surface of the eyewire and thereby forwardly overhanging the eyewire, an internally threaded tube projecting rearwardly from the rear face of the bridge and secured to an adjacent nasal portion of the eyewire, an eyebrow piece covering the upper portion of the eyewire, said piece having a recess at one end thereof receiving said end part of the bridge and the tube, a perforated ear at said one end of said piece forming the rear of the recess, a screw passing through the perforation of the ear and into the tube, the temporal part of the eyewire having clamping tubes thereon, one of said clamping tubes having an internally threaded opening therein having an axis perpendicular to the axis of the tube, and a second screw passing forwardly from the rear face of said piece into said opening.

8. The spectacle front of claim 7, a temple hinge on the rear face of said piece, a rivet shield on the front face of said piece, a rivet extending forwardly from said shield through said piece and said hinge and headed at the hinge, and a relatively short pin extending forwardly from the shield into said piece.

9. In a spectacle front, a split eyewire, clamping tubes on the respective split ends of the eyewire, one of the tubes having an internally threaded opening therein having an axis perpendicular to the axis of the tube, an eyebrow piece receiving the top part of the eyewire and the clamping tubes, a screw passing forwardly through one end part of the eyebrow piece into the internally threaded opening, a perforated ear at the rear portion of the other end part of the eyebrow piece, a bridge secured to the eyewire, an internally threaded projection extending rearwardly from the rear face of the bridge toward the ear and normally concealed by the bridge, and a screw passing forwardly through the ear and into the projection.

10. The spectacle front of claim 9, the eyebrow piece being wider than the eyewire and forwardly and rearwardly overhanging the eyewire, the projection being a tube soldered to the rear face of the bridge and to the eyewire, there being a recess in the eyebrow piece in front of the ear thereof, said recess receiving an end part of the bridge and the tube.

11. In a spectacle front, a pair of metallic eyewires, an imperforate metallic bridge having the respective end parts thereof substantially flat and secured to the eyewires with the rear face of the bridge at the front surfaces of the eyewires, a plastic eyebrow piece receiving the upper part of and arranged at and forwardly overhanging each of the eyewires with the front surface of said piece substantially flush with the front face of the adjacent one of said end parts of the bridge, the bridge terminating at the inner edges of the eyewires and the respective end edges of the bridge being contoured to correspond to said inner edges, means including a projecting perforated ear on the rear part only of the eyebrow piece, a detachable fastening element passing through the ear, an operative connection between the ear and the rear surface of the bridge for removably connecting the nasal end of the eyebrow piece to, and spacing said end rearwardly away from, the bridge, and means detachably connecting the temporal end of the eyebrow piece to the temporal end of the adjacent eyewire comprising a hinge secured to the eyebrow piece independently of the eyewire, a temple carried by the hinge, a screw through the hinge and entering the eyebrow piece and an operative connection between the screw and the eyewire, the operative connection between the ear and the bridge comprising an internally threaded combined spacer and tube secured to the rear face of one of the end parts of the bridge and abutting against the front face of the ear, the fastening element comprising a screw passing forwardly from the rear face of the ear into the tube, the nasal end of the eyebrow piece having a recess therein in front of the ear and open at the front thereof, said recess receiving said bridge end part and the tube whereby the entire area of the front surface of the bridge is exposed.

References Cited in the file of this patent

UNITED STATES PATENTS

| Number | Name | Date |
| --- | --- | --- |
| 2,577,380 | Stegeman | Dec. 4, 1951 |